United States Patent [19]
Kashima et al.

[11] Patent Number: 5,735,590
[45] Date of Patent: Apr. 7, 1998

[54] BACKLIGHTING DEVICE WITH A TRANSPARENT SHEET HAVING STRAIGHT RIDGES

[75] Inventors: Keiji Kashima, Saitama; Naoki Yoshida, Kanagawa; Taiji Yamamoto, Kanagawa; Yukio Inagaki, Kanagawa, all of Japan

[73] Assignee: Tosoh Corporation, Yamaguchi, Japan

[21] Appl. No.: 396,529

[22] Filed: Mar. 1, 1995

[30] Foreign Application Priority Data

| Mar. 2, 1994 | [JP] | Japan | 6-032179 |
| Apr. 25, 1994 | [JP] | Japan | 6-086222 |

[51] Int. Cl.$^6$ ............................................. F21V 8/00
[52] U.S. Cl. ................................................ 362/31; 362/26
[58] Field of Search ............................ 362/26, 260, 31, 362/330, 339, 331

[56] References Cited

U.S. PATENT DOCUMENTS

| 4,794,492 | 12/1988 | Vinther | 362/31 |
| 5,402,324 | 3/1995 | Yokoyama et al. | 362/31 |
| 5,408,388 | 4/1995 | Kobayashi et al. | 362/31 |
| 5,521,797 | 5/1996 | Kashima et al. | 362/26 |

FOREIGN PATENT DOCUMENTS

| 0006450 | 9/1980 | European Pat. Off. | G02B 5/02 |
| 0556606 | 8/1993 | European Pat. Off. | G02F 1/00 |

*Primary Examiner*—Y My Quach
*Attorney, Agent, or Firm*—Sughrue, Mion, Zinn, Macpeak & Seas, PLLC

[57] ABSTRACT

A linear light source is disposed adjacent to the side face of a transparent light conducting plate. The thickness of the light conducting plate decreases as the position goes away from the light source. Light diffusing elements are formed on the major surface of the light conducting plate opposite to its light exit surface. At least one transparent sheet has, on the same surface thereof, a number of prisms having straight ridges that are arranged substantially parallel with each other at small intervals. The transparent sheet is disposed on the side of the light exit surface of the light conducting plate so that extensions of the straight ridges intersect the light source substantially perpendicularly.

11 Claims, 8 Drawing Sheets

BACKLIGHTING DEVICE WITH A TRANSPARENT SHEET HAVING STRAIGHT RIDGES

BACKGROUND OF THE INVENTION

The present invention relates to a backlighting device for illuminating a transmission-type or semi-transmission-type panel from its back side.

In recent years, thin and highly legible liquid crystal display devices having a backlighting device are used as display devices for lap-top-type or book-type word processors, computers, or the like. As shown in FIG. 1, edge-light-type backlighting devices are commonly used for that purpose in which devices a linear light source 4 such as a fluorescent tube is disposed adjacent to end faces of a transparent light conducting plate 1. In many of the edge-light-type backlighting devices, as shown in FIG. 2, light diffusing elements 6 in dots or stripes are formed on one major surface of the light conducting plate 1, and this major surface is almost entirely covered with a specular reflecting plate or a light diffusing/reflecting sheet 3. The opposite major surface (light exit surface) of the light conducting plate 1 is covered with a light diffusing sheet 2. The light diffusing ability of the sheet 2 may be given by applying a light diffusive substance such as $TiO_2$ or $SiO_2$ to a transparent base film such as a polyethylene terephthalate (PET) film, or by embossing a transparent sheet such as a polycarbonate (PC) sheet.

In particular, as shown in FIGS. 3(a) and 3(b), some backlighting devices employ a structure in which the thickness of the light conducting plate 1 gradually decreases as its position goes away from the linear light source 4. The reason why this structure is needed is as follows. In the linear light source 4 such as a fluorescent tube, the light emitting portion has a certain thickness of, for instance, 3 mm. To efficiently input the light emitted from the linear light source 4 to the end face of the light conducting plate 1, the thickness of the end face needs to be close to the thickness of the linear light source 4 (for instance, 3 mm) or larger than the latter (for instance, 4 mm).

Where the light conducting plate 1 has the structure in which the thickness of the light conducting plate 1 gradually decreases as its position goes away from the linear light source 4, a configuration is commonly employed in which the light diffusing elements 6 and the light diffusing sheet 2, both of which are attached to the light conducting plate 1, are so spaced from each other as to make it difficult for the naked eye to recognize the pattern of the light diffusing elements 6 through the light diffusing sheet 2.

However, where the light diffusing sheet 2 is spaced from the surface of the light conducting plate 1 by a substantially constant distance via an air layer as shown in FIG. 3(a), the distance between the light diffusing sheet 2 and the light diffusing elements 6 gradually decreases as the position goes away from the linear light source 4. Therefore, although the pattern of the portion of the light diffusing elements 6 close to the linear light source 4 is not recognized through the light diffusing sheet 2, the pattern of the portion distant from the linear light source 4, where the light conducting plate is thinner, is recognized.

To solve this problem, it has been proposed to laying a plurality of light diffusing sheets 2 one on another. But this configuration is disadvantageous in that the backlighting device becomes thicker by an increased number of light diffusing sheets 2, which not only contradicts the need for a thinner backlighting device but also makes the device costly. In addition, this configuration is not preferable in terms of the brightness of the light exit surface.

To make the individual light diffusing elements 6 attached to the light conducting plate 1 undiscernible, it may be conceivable to reduce the interval between the respective light diffusing elements 6 to, for instance, 50 μm. However, it is technically difficult to form the light diffusing elements 6 of such a fine structure.

Therefore, it is typically the case that, as shown in FIG. 3(b), an air layer is provided between the light diffusing sheet 2 and the light conducting plate 1 such that the thickness of the air layer increases as the position goes away from the linear light source 4, to thereby make the distance between the light diffusing sheet 2 and the light diffusing elements 6 substantially constant. Thus, the pattern of the light diffusing elements 6 becomes undiscernible over the entire light emitting surface of the light conducting plate 1.

However, to make the distance between the light diffusing sheet 2 and the light diffusing elements 6 constant, a proper mechanism needs to be provided to maintain the positional relationship between the light diffusing sheet 2 and the light diffusing elements 6. This complicates the configuration of the backlighting device and makes it heavier, resulting in an increased cost. Further, there occurs a problem of reduced reliability when an external force is applied to the light diffusing sheet 2. Still further, a considerable space is formed between the light diffusing sheet 2 and the light conducting plate 1 which is not preferable in terms of the size reduction of the backlighting device, i.e., the entire display panel.

On the other hand, as the backlighting device comes to be driven by a battery, it is desired that the power-brightness conversion efficiency be further improved. With this requirement, it has been proposed to provide, on the light emitting surface of the backlighting device, a sheet made of a transparent material and equipped with a number of prisms or protrusions having straight ridges that are arranged approximately parallel with each other at very small intervals on the same surface. Thus, the light output from the backlighting device is given certain directivity, so that the brightness in the normal direction of the light exit surface is increased. However, since the sheet itself is not so diffusive as to shield the light diffusing elements, the pattern of the light diffusing elements 6 is recognized through the sheet, which is not preferable in producing uniform plane-like light emission.

To solve this problem, it has been proposed to make the sheet diffusive by applying a light diffusive substance to the sheet itself or by making the sheet surface randomly coarse. However, this attempt adversely affects the original purpose of the sheet of giving directivity to the light emitted from the backlighting device, thus reducing the brightness of the light exit surface.

In the case of the light conducting plate 1 whose thickness decreases as the position goes away from the linear light source 4, a light beam entering the light conducting plate 1 through its end face is repeatedly subjected to total reflection at its boundaries while taking a path that gradually shifts toward a direction that no longer satisfies the total reflection condition. Finally, the light beam is obliquely output from the light exit surface of the light conducting plate 1 (see FIG. 4). The light beams that are output from the light exit surface of the light conducting plate 1 in this manner have an intensity variation in which high-brightness portions and low-brightness portions alternately appear parallel with the central axis of the light source 4, that is, assumes a striped pattern. Thus, the above backlighting device cannot be used as a plane-like light source. In particular, where the sides representing the two major surfaces of a cross-section taken perpendicularly to the two major surfaces of the light conducting plate 1 form a straight line, a brightness ratio of the high-brightness portions of the striped pattern to the other portions becomes more than 100:1, which is a very serious problem in obtaining a uniform light emitting surface.

As described above, to improve the power-brightness conversion efficiency of the backlighting device, it has been proposed to use the sheet equipped with prisms or protrusions having straight ridges. However, where the light conducting plate 1 is used whose thickness decreases as the position goes away from the linear light source 4 and the sheet 8 having the straight ridges is so disposed that the straight ridges are arranged substantially parallel with the linear light source 4 (see FIG. 5), the light beams contributing to formation of the high-brightness portions of the striped pattern are so refracted as to exit toward the normal direction of the light exit surface. Therefore, while the power-brightness conversion efficiency in the normal direction or a direction close thereto is improved, the striped pattern appears in the same direction. Thus, such a backlighting device may not be used as a uniform plane-like light source.

To solve this problem, it has been proposed to interpose a light diffusing sheet having a sufficient light diffusing ability to eliminate the striped pattern between the sheet having the straight ridges and the light conducting plate 1. However, this configuration is not practical, because both of the light transmittance and the power-brightness conversion efficiency are reduced. It has also been proposed to dispose a light diffusing sheet having a sufficient light diffusing ability to eliminate the striped pattern on the light exit side of the sheet having the straight ridges. However, this configuration is not practical too, because not only the power-brightness conversion efficiency is reduced but also the light directivity is deteriorated, that is, the brightness in the normal direction of the light exit surface is lowered.

SUMMARY OF THE INVENTION

An object of the present invention is to provide a thin backlighting device which is inexpensive and has a high power-brightness conversion efficiency. Another object of the invention is to provide a backlighting device which can provide uniform plane-like light emission that is high in brightness and free of a striped pattern, the backlighting device being of the type that uses a light conducting plate whose thickness decreases as the position goes away from a linear light source, in particular, a light conducting plate in which the side representing a major surface of a cross-section taken by a plane perpendicular to the major surface of the light conducting plate forms a straight line.

The present inventors have made various investigations into the above-described items, and have found that a relatively thin backlighting device can be obtained in which the light diffusing elements formed on the light conducting plate are shielded and become undiscernible, and which can provide sufficiently strong light directivity and high power-brightness conversion efficiency in a direction substantially perpendicular to the light exit surface of the backlighting device, by disposing a sheet having a function of enhancing the directivity of light emitted from the light exit surface on the light conducting plate so as to satisfy a certain condition. Thus, the invention has been completed.

According to a first aspect of the invention, a backlighting device comprises:

at least one linear light source;

a light conducting plate made of a transparent material and having a side face adjacent to the light source, the thickness of the light conducting plate decreasing as the position goes away from the light source;

dotted or striped light diffusing elements formed on a major surface of the light conducting plate opposite to a light exit surface thereof; and at least one sheet made of a transparent material having, on the same surface thereof, a number of prisms or protrusions having straight ridges that are arranged substantially parallel with each other at small intervals, the sheet being disposed on the side of the light exit surface of the light conducting plate so that the straight ridges cross imaginary lines of the dotted light diffusing elements connecting centers of the dotted light diffusing elements that are adjacent to each other at the minimum interval, or an imaginary line of the striped light diffusing elements connecting center lines of the striped light diffusing elements that are adjacent to each other at the minimum interval.

According to a second aspect of the invention, a backlighting device comprises:

at least one linear light source;

a light conducting plate made of a transparent material and having a side face adjacent to the light source, the thickness of the light conducting plate decreasing as the position goes away from the light source;

light diffusing elements formed on a major surface of the light conducting plate opposite to a light exit surface thereof; and at least one sheet made of a transparent material having, on the same surface thereof, a number of prisms or protrusions having straight ridges that are arranged substantially parallel with each other at small intervals, the sheet being disposed on the side of the light exit surface of the light conducting plate so that extensions of the straight ridges intersect the central axis of the light source substantially perpendicularly.

DESCRIPTION OF THE PREFERRED EMBODIMENTS

The present invention will be hereinafter described in further detail with reference to the accompanying drawings.

Figure 1:
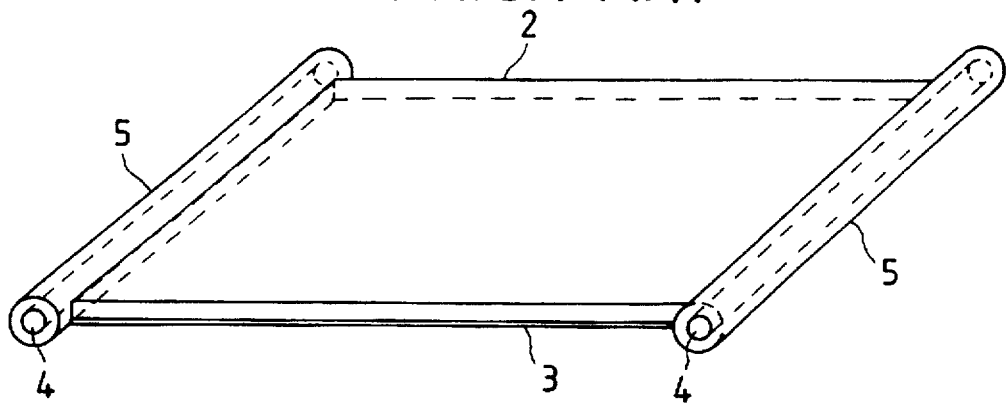
FIG. 1 is a perspective view of a conventional backlighting device.
Figure 2:
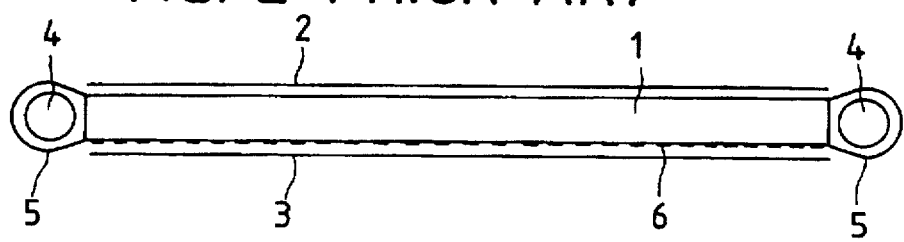
FIG. 2 is a sectional view of the conventional backlighting device of FIG. 1.
Figure 3A:
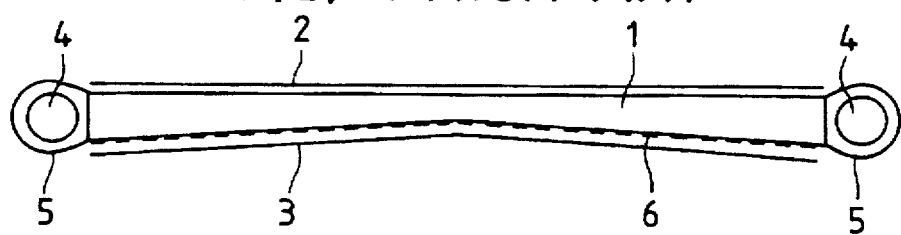
FIGS. 3(a) and 3(b) are sectional views showing other conventional backlighting devices.
Figure 3B:
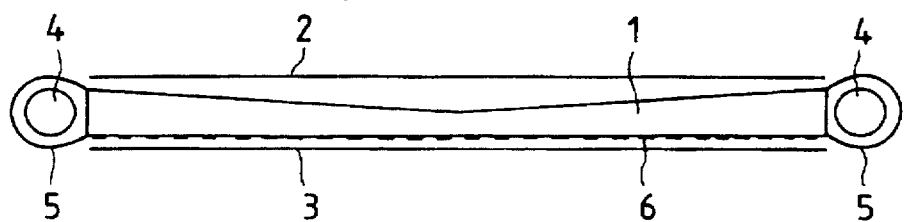
Figure 4:
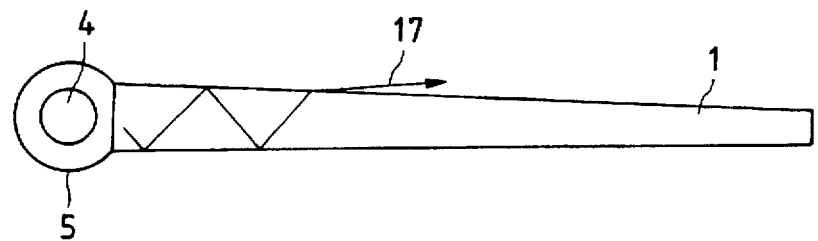
FIG. 4 illustrates how a striped brightness pattern occurs in a conventional backlighting device.
Figure 5:
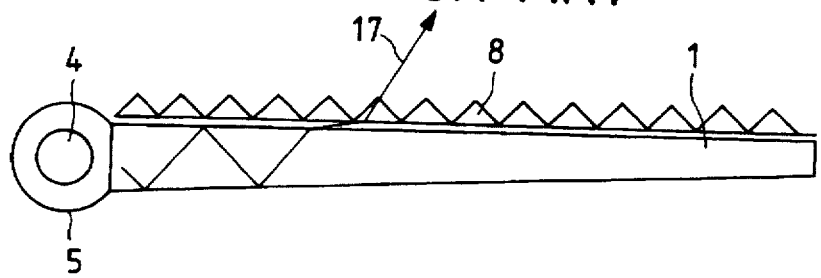
FIG. 5 shows a light beam path in a conventional backlighting device.
Figure 6:
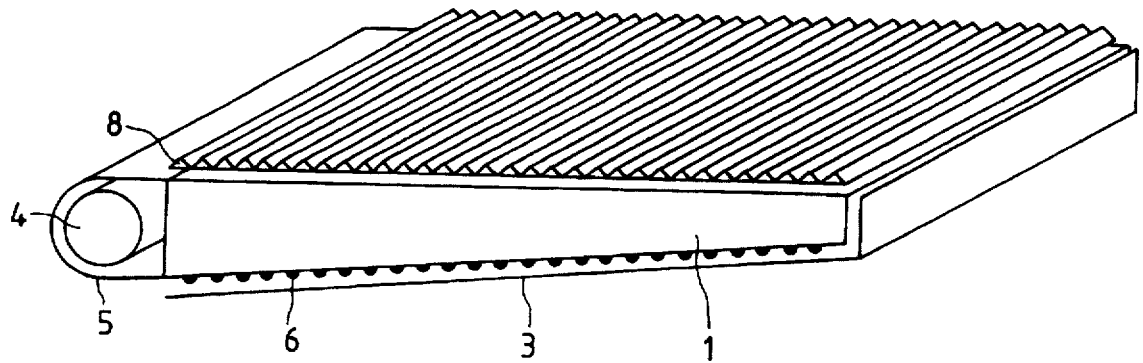
FIG. 6 is a perspective view of a backlighting device according to an embodiment of the present invention.
Figure 7:
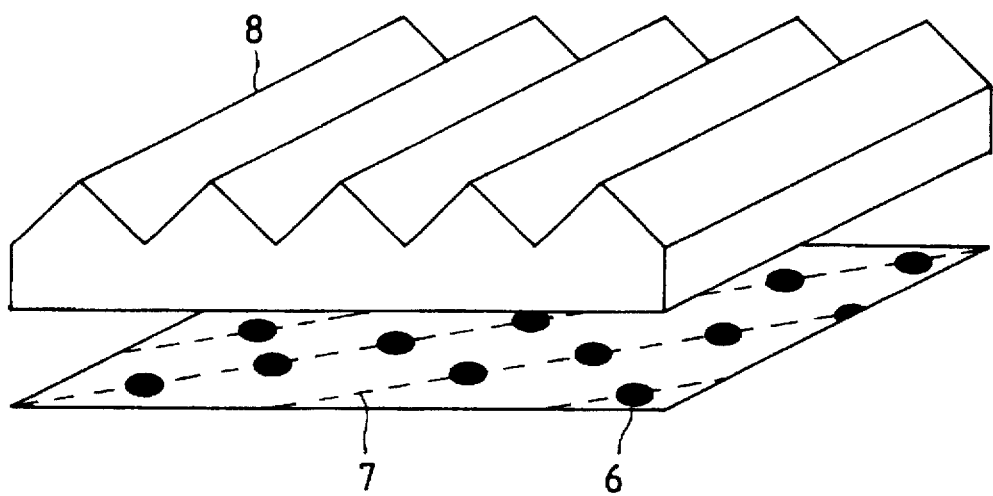
FIG. 7 shows an example of a relationship between a transparent sheet and imaginary lines on a light conducting plate in the invention.

FIG. 6 is a perspective view of a backlighting device according to an embodiment of a first aspect of the invention, and FIG. 7 is an enlarged partial view showing a relationship between a transparent sheet and imaginary lines on a light conducting plate. In these figures, a light conducting plate 1 is ordinarily a plate-like member, and may be made of any material as long as it transmits light efficiently. For example, it is made of quartz, glass, or a transparent natural or synthetic resin such as acrylic resins.

In the invention, it is indispensable that the light conducting plate 1 be shaped such that the thickness decreases as the position goes away from a linear light source 4. There is no specific limitation of the thickness of the portion farthest from the linear light source 4, i.e., the thinnest portion of the effective area of the light conducting plate 1. From the viewpoint of mechanical strength of the light conducting plate 1, the thickness of that portion is usually made 0.5 mm or more, preferably 1 mm or more, with a guideline being 25% to 75% of the thickness of the thickest portion of the effective area, which portion is adjacent to the linear light source 4.

The thickest portion thickness of the light conducting plate 1 is suitably determined in accordance with the diameter of the linear light source 4. While to improve the efficiency of light utilization it is preferred that the maximum thickness of the light conducting plate 1 be larger than the diameter of the linear light source, to make the backlighting device thinner and lighter it is preferred that the maximum thickness be as small as possible. Usually, the maximum thickness is 0.5 to 1.6 times the diameter of the linear light source 4. By employing the structure in which the thickness of the light conducting plate 1 decreases as the position goes away from the linear light source 4, the light conducting plate 1 can be made lighter while the efficiency of light incidence on the end face of the light conducting plate 1 is kept the same.

In the first aspect of the invention, the thickness of the light conducting plate 1 may decrease either continuously or in a step-like manner. It is preferred that the light exit surface of the light conducting plate 1 be so shaped that the side representing the light exit surface of a cross-section of the light conducting plate 1 is forms a substantially straight line. It is also preferred that the light exit surface be approximately parallel with a transparent sheet (described later) via a thin air layer.

Light diffusing elements 6 may be formed on the back surface of the light conducting plate 1 by one of the following methods. In the first method, a light diffusive substance such as silica, barium sulfate, calcium carbonate, titanium white, glass beads, resin beads, a paint containing air bubbles, or a printing ink is printed on the surface of the light conducting plate 1 in dots or stripes by screen printing or some other method. In the second method, the surface of the light conducting plate 1 is coarsened in dots or stripes. In the third method, the surface of the light conducting plate 1 is formed with small holes or small protrusions. In the fourth method, the light conducting plate 1 is cut in a step-like manner. In the above methods, the dots of the light diffusing elements 6 are, for instance, circular or square when they are formed by screen printing. And the striped light diffusing elements 6 are shaped like straight lines.

In the first aspect of the invention, in the case of the dot-like diffusing elements 6, the imaginary lines formed on the light conducting plate 1 by the light diffusing elements 6 are so drawn as to connect the centers of the dots that are adjacent to each other substantially at the shortest interval. In the case of the striped light diffusing elements 6, the imaginary line is so drawn as to connect the center lines of the stripes at the shortest interval. The imaginary lines, which are drawn in the above manner, are normally used as a reference when the light diffusing elements 6 are formed on the light conducting plate 1.

Figure 8:
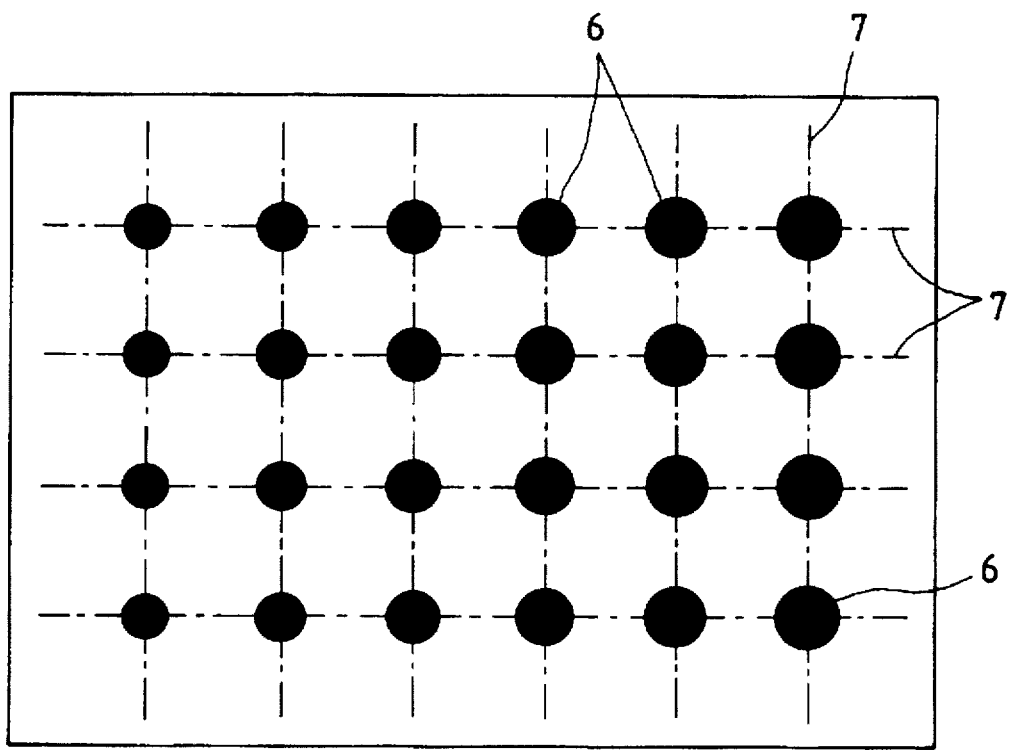
FIGS. 8–12 show examples of imaginary lines of light diffusing elements formed on the light diffusing plate in the invention.
Figure 9:
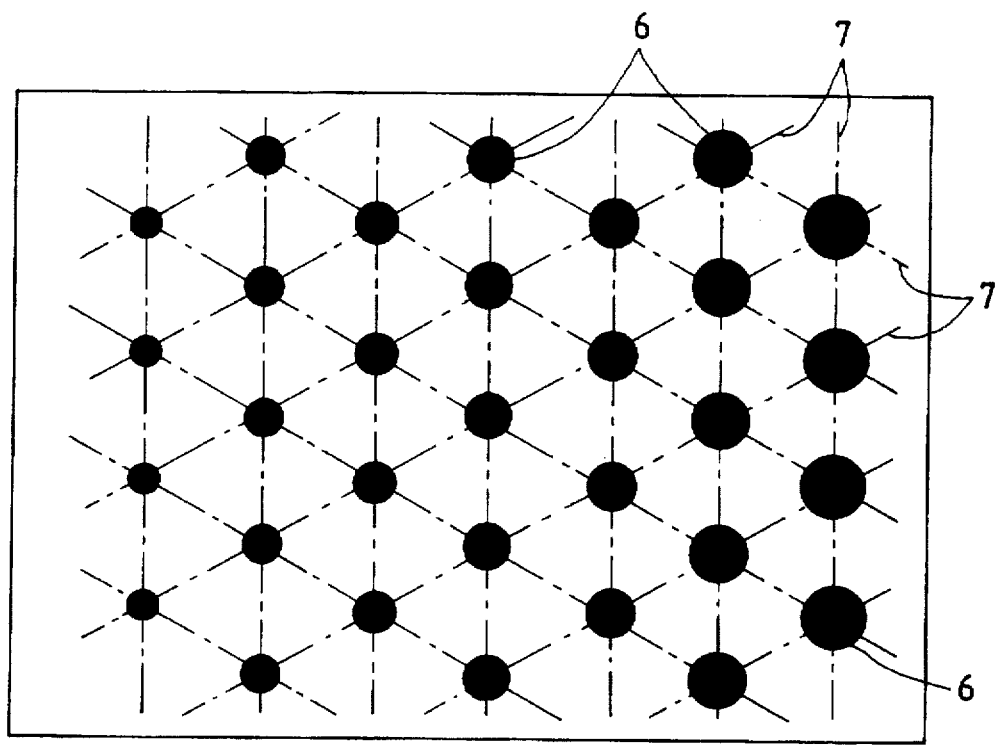
Figure 11:
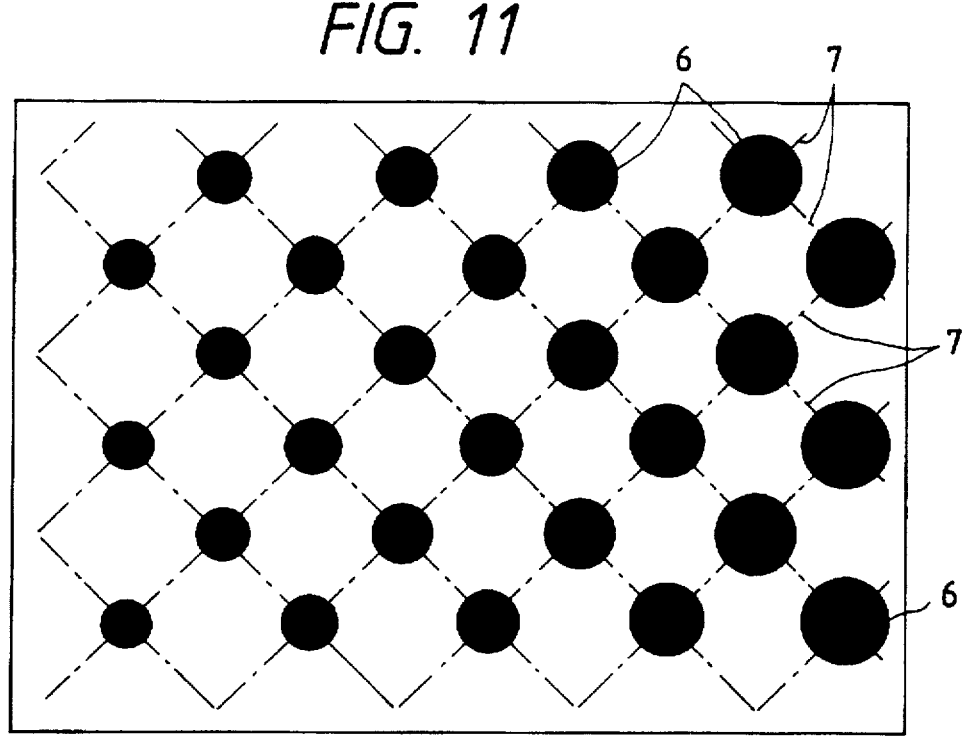

FIG. 8 shows an example of a pattern of forming the light diffusing elements 6 on the light conducting plate 1. As described above, light diffusing elements 6 are formed by applying a light diffusive substance to the surface of the light conducting plate 1, providing holes or protrusions on the surface, coarsening the surface, or cutting the light conducting plate 1. Reference numeral 7 denotes imaginary lines as described above. In consideration of the ease of manufacturing, it is a general procedure that as shown in FIGS. 8 and 11, the light diffusing elements 6 are formed so that two groups of substantially parallel imaginary lines 7 (lines connecting the centers of the light diffusing elements 6 that are adjacent to each other at the minimum interval) intersect each other at right angles, that is, so that the imaginary lines 7 form squares. For the same reason, the light diffusing elements 6 may be formed so that as shown in FIG. 9, the imaginary lines 7 (lines connecting the centers of the light diffusing elements 6 that are adjacent to each other at the minimum interval) form regular triangles.

Figure 10:
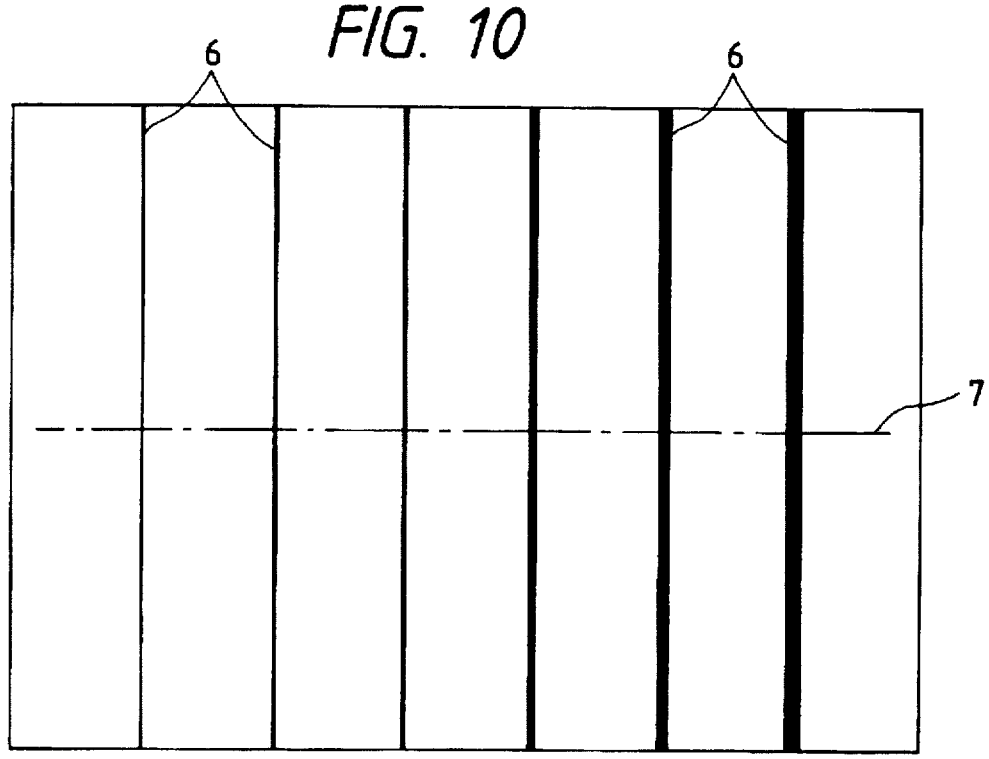

In the first aspect of the invention, the imaginary lines 7 having the above-described pattern cross straight ridges of a sheet made of a transparent material (described later). Where the imaginary lines 7 perpendicularly intersect each other as in the case of FIG. 8, and further the imaginary lines 7 cross the straight ridges of the sheet made of a transparent material at 90° or 0°, the advantages of the invention (described later) are not fully obtained.

Where the striped light diffusing elements 6 (see FIG. 10) are formed, for instance, by applying a light diffusive substance to the surface of the light conducting plate 1 or by cutting the light conducting plate 1, in an ordinary state, they are in many cases formed approximately parallel with the center line of the linear light source 4 (described later). In the first aspect of the invention, the striped light diffusing elements 6 are so formed that the imaginary line 7 (the line connecting the center lines of the stripes at the minimum interval) crosses the straight ridges of the sheet made of a transparent material (described later).

Figure 12:
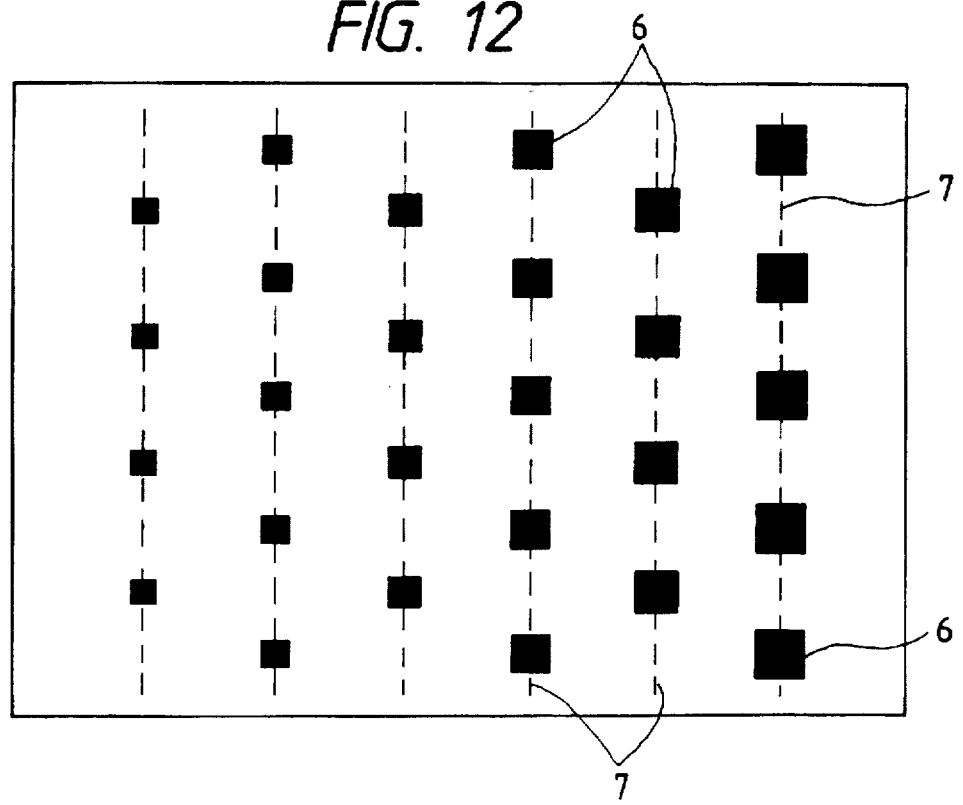

FIG. 12 shows an example in which square dots are arranged at the same intervals in the minor-axis direction of the light conducting plate 1. In this case, imaginary lines 7 are lines that connect the centers of the light diffusing elements 6 that are adjacent to each other at the minimum interval.

To make the pattern of the light diffusing elements 6 undiscernible to the naked eye over the entire light emitting area when viewed through the sheet made of a transparent material (described later), it is particularly preferred that the imaginary lines 7 be substantially parallel with each other. It is not always necessary that all the imaginary lines 7 be parallel with each other only in a single direction. But they may be parallel with each other in two directions (see FIG. 8) or in three directions (see FIG. 9).

It is preferred that the intervals between the substantially parallel imaginary lines 7 on the light conducting plate 1 be in the range of 0.01 to 5 mm. However, if the intervals are longer than 3 mm, the pattern itself of the light diffusing elements 6 are more likely recognized through the sheet. On the other hand, if the intervals are shorter than 0.03 mm, the manufacturing yield is extremely lowered. Therefore, the preferable range of the intervals is 0.03 to 2 mm.

In the invention, to effectively shield the light diffusing elements 6 on the light conducting plate 1, it is preferred that the straight ridges of the sheet made of a transparent material and the imaginary lines 7 cross at 10° to 70°. The preferable range of the crossing angle depends on the pattern of the light diffusing elements 6. Specifically, where the imaginary lines 7 form squares (FIGS. 8 and 11), they are substantially parallel lines extending in a single direction (FIG. 12), or the light conducting elements 6 assume stripes (FIG. 10), it is preferred that the crossing angle be in the range of 20° to 70°, particularly about 22.5°, 26.6°, 45°, 63.4° and 67.5°. Where the imaginary lines 7 form regular triangles (FIG. 9), it is preferred that the crossing angle between the straight ridges and the imaginary lines be in the range of 10° to 50°, particularly about 19.1° and 30°.

A preferable mode of the linear light source 4 is as follows. The linear light source 4 is covered by a light reflector 5 that has a slit to allow light to enter the end face of the light conducting plate 1, and that is made of a specular reflecting sheet of Ag, Al, or the like, or a light diffusing/reflecting sheet in which light diffusiveness is provided by applying $BASO_4$ or $TiO_2$ to a polyethylene terephthalate (PET) sheet or by causing the PET sheet to contain air bubbles. A certain gap is provided between the outer surface of the linear light source 4 and the light reflector 5. The linear light source 4 is disposed in close proximity to at least one end face (any of one to four end faces) of the light conducting plate 1 so that its central axis is approximately parallel with the end face of the light conducting plate 1. Although the linear light source 4 may be a fluorescent tube, tungsten incandescent tube, an optical rod, an array of LEDs, or the like, the fluorescent tube is preferable. From the viewpoint of power saving, it is preferred that the length of the uniform light emitting portion (excluding the electrode portions) be approximately equal to the length of the adjacent end face of the light conducting plate 1.

The light diffusing/reflecting sheet 3 is a specular reflecting sheet of Ag, Al, or the like, or a light diffusing/reflecting sheet in which light diffusiveness is provided by applying $BASO_4$ or $TiO_2$ to a PET sheet or by causing the PET sheet to contain air bubbles, and is so disposed as to cover the entire surface of the light conducting plate 1 on which surface the light diffusing elements 6 are formed.

Figure 13:
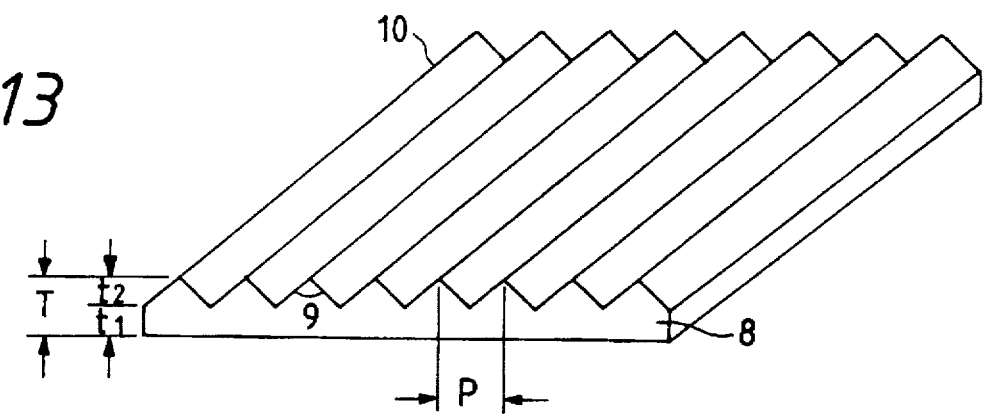
FIGS. 13–16 show examples of structures of surfaces of transparent sheets used in the invention.

In the figures, reference numerals 8, 12, 14 and 16 denote sheets made of a transparent material. For example, the sheet has a number of prisms 10 (FIG. 13), protrusions 11 (FIG. 14) or wave-like protrusions 13 (FIG. 15) having straight ridges that are arranged approximately parallel with each other at very small intervals on the same surface, and is disposed on the light exit side of the light conducting plate 1 so that the ridges are located outside, i.e., on the side opposite to the surface of the sheet facing the light conducting plate 1. The shape of the prisms is not limited to that shown in FIG. 13, but may have sloped faces of different lengths.

The first aspect of the invention is characterized in that one or more sheets each having the above structure are disposed on the light exit side of the light conducting plate 1 such that the ridges cross the imaginary lines 7 on the light conducting plate 1. By disposing the sheets in this manner, the directivity of the light emitted from the light exit surface of the backlighting device is changed so that the light gathers around the normal direction of the light exit surface. As a result, a backlighting device is obtained which has a high power-brightness conversion efficiency and in which the pattern of the dots or stripes of the light diffusing elements 6 is undiscernible.

If necessary, the conventional light diffusing sheet may be provided additionally. In such a case, by virtue of the invention, the light diffusiveness of the light diffusing sheet can be much smaller than that needed when it is used in the conventional configuration. Since the light transmittance of the light diffusing sheet is increased, there occurs almost no brightness reduction even if it is interposed between the light conducting plate 1 and the sheet of the invention. If the light exit surface of the light diffusing sheet is coarser than its light entrance surface, the brightness is further increased. Even if the light diffusing sheet is disposed outside the sheet of the invention, the directivity of the light obtained by the sheet of the invention is not much changed.

A further detailed description will be made of the sheets 8, 12, 14 and 16 of the invention which are made of a transparent material. There is no specific limitation on the material of the sheet except that it is required to be transparent. For example, the sheet may be made of methacrylate, polycarbonate, polyvinyl chloride, polystyrene, polyamide, polyester, polyethylene, polypropylene, cellulose resins, or glass. An example of the straight ridges that are formed parallel with each other on the light exit side of the sheet is those of prisms (see FIG. 13) having at least two optical surfaces. The ridge 10 that is formed by the intersecting two optical surfaces is substantially straight, and a number of parallel straight prisms exist on the same surface at very small intervals P. The top portion of each ridge formed on the sheet has substantially the same shape in its longitudinal direction, which means that substantially the same apex angles are formed when the ridge is cut by parallel planes arranged in its longitudinal direction.

It is preferred that the apex angle 9 of the ridges of the sheet be 70° to 150°. The more preferable apex angle range of the ridges depends on the refractive index of the sheet material and the light distribution characteristic of the plane-like light-emitting body. For example, where a material having a large refractive index (polycarbonate; n=1.59) is used, the light emitted from the plane-like light-emitting body is also output in directions other than around the normal direction of the light exit surface if the apex angle is smaller than 90°, and does not sufficiently gather around the normal direction if the apex angle is larger than 110°. Therefore, the range of 90° to 110° is particularly preferable.

Figure 14:
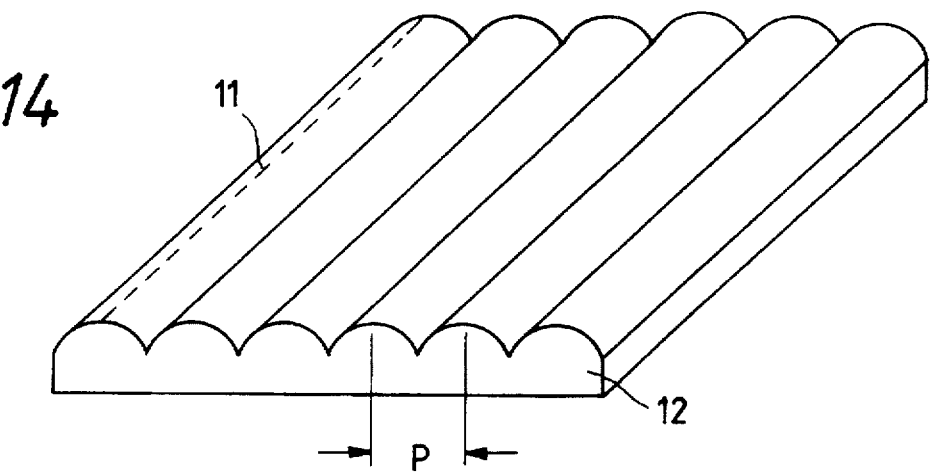
Figure 15:
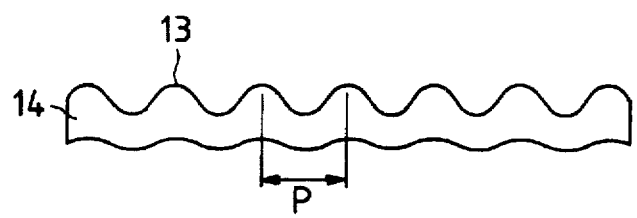

FIG. 14 shows another example of the transparent sheet used in the invention. That is, in a transparent sheet 12, the ridges 11 have a circular arc convex cross-section.

Figure 16:
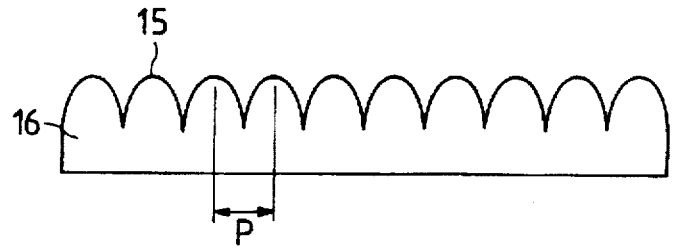

There is no specific limitation on the shape of the convex ridges of the sheet except that they should be parallel with each other. Other examples of the shape of a cross-section taken perpendicularly to the ridge extending direction are part of a circle, part of an ellipse, a wave shape (see FIG. 15), and a fish paste shape (FIG. 16). Convex ridge shapes are particularly preferable, because the ridges themselves has a lens action and therefore make the pattern of the light diffusing elements 6 further undiscernible by causing it to be recognized as a distorted pattern.

To make the asperity of the ridges hard to be recognized by the naked eye through the light that is output from the surface of the sheet, it is preferred that the intervals P between a number of ridges formed on the sheet be 1–1,000 µm, particularly 10–1,000 µm. In particular, where the backlighting device of the invention used in a liquid crystal display, to suppress a spatial moiré phenomenon as caused by the pixels of the liquid crystal display and the ridges formed on the sheet of the invention, it is preferred that the intervals between the ridges be smaller than (particularly, less than ⅓ of) the pixel pitch of the liquid crystal display. For example, when the pixel pitch of the liquid crystal display is 0.3 mm, it is preferred that the intervals between the ridges be less than 0.3 mm, particularly less than 0.1 mm.

The height $t_2$ (see FIG. 13) of the ridges is determined by their apex angle or width, and their interval. On the other hand, the sheet needs to have a certain thickness $t_1$ (see FIG. 13) to assure that a number of straight ridges are kept parallel with each other with very small intervals. The thickness $t_1$ should be smaller to increase the light transmittance and make the backlighting device thinner. But in view of the manufacture and strength of the sheet, the total thickness T (see FIG. 13) of the sheet should be 10–3,000 µm, preferably 50–1,000 µm. To enhance the effects of using the sheet, it is preferred that the ridges formed on the same surface have the same shape.

In the invention, there is no specific limitation on the method of forming the sheet except the requirement that ridges having substantially the same shapes should be formed parallel with each other at very small intervals. Examples are hot press die forming, embossing, mold forming, a method of applying an ultraviolet curing resin on a base film, and chemical processing. Slight rounding of the ridges, which occurs due to reasons in manufacture, is permitted as long as it does not much affect the advantages of the invention.

It is preferred that the sheet and the light conducting plate 1 be not in optical contact with each other, for instance, an air layer be interposed in between. It is therefore preferred that the degree of contact in terms of optics be reduced by somewhat coarsening the surface of the sheet opposing the light conducting plate 1, or by interposing a spacer-like element.

The contrast of a liquid crystal display becomes lower as the viewing angle increases, which is defined with respect to the normal direction of the display screen. Therefore, in practice, the brightness around the normal direction is regarded as important. Also in a view finder, in practice the brightness around the normal direction is regarded as important, because the display screen is viewed only in the normal direction of the screen.

In the invention, the output light is given directivity by disposing on the light exit side of the backlighting device the sheet having, on its light exit side, a number of straight prisms that are arranged parallel with each other at very small intervals, as described above. The establishment of the directivity is evidenced by the following and other facts. The brightness of light emitted from the light exit surface as measured substantially in its normal direction increases when the sheet is inserted. The ratio of the brightness as measured in a direction inclined by a certain angle (for instance, 40°) from the normal direction of the light exit surface to the brightness as measured substantially in the normal direction decreases when the sheet is inserted (for instance, about 0.5).

The first aspect of the invention is characterized in that, as described above, at least one transparent sheet is so disposed that the approximately parallel ridges cross the imaginary lines 7 on the light conducting plate 1. Specifically, in FIG. 7, the sheet is so disposed that its ridges 8 cross the imaginary lines 7 on the light conducting plate 1.

With this arrangement, the sheet can shield the pattern of the light diffusing elements 6 more effectively. That is, the sheet has an effect of causing a viewer to recognize the dotted or striped light diffusing elements 6 as if they existed at locations on the light conducting plate 1 where they do not exist actually. This is an optical effect of the sheet resulting from the arrangement that the sheet is so disposed that its ridges cross the imaginary lines 7.

Where two or more transparent sheets are laid one on another, the brightness is increased from the case of using a single sheet. To further improve the effect of shielding the pattern of the dotted or striped light diffusing elements 6, it is preferred that the two or more sheets be so arranged that the ridges of the respective sheets cross each other.

As for the crossed relationship between the ridges of the respective transparent sheets, it is preferred that the ridges cross each other at an angle substantially in the range of 75° to 115°. The effect of shielding the pattern of the dotted or striped light diffusing elements 6 is maintained even if the ridges cross each other at an angle out of the 75° to 115° range, the shielding effect is enhanced in the 75° to 115° range. A crossing angle of about 90° is most preferable. Also the brightness is improved in the above angular range.

In the invention, to shield the pattern of the light diffusing elements 6 formed on the light conducting plate 1, it is preferred that for instance a light diffusing sheet, which is used conventionally, be interposed between the light conducting plate 1 and the transparent sheet.

Figure 17:
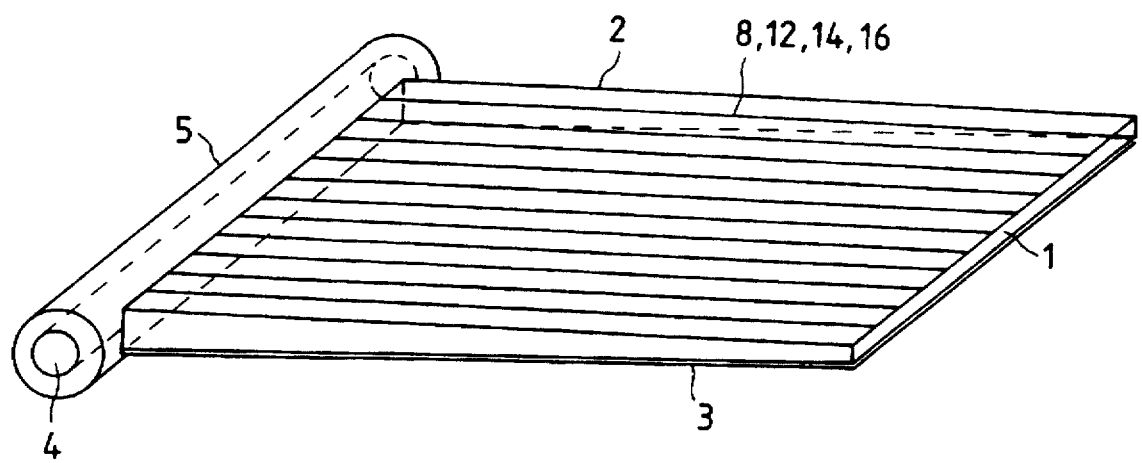
FIG. 17 is a perspective view of a backlighting device according to an embodiment of a second aspect of the invention.
Figure 18:
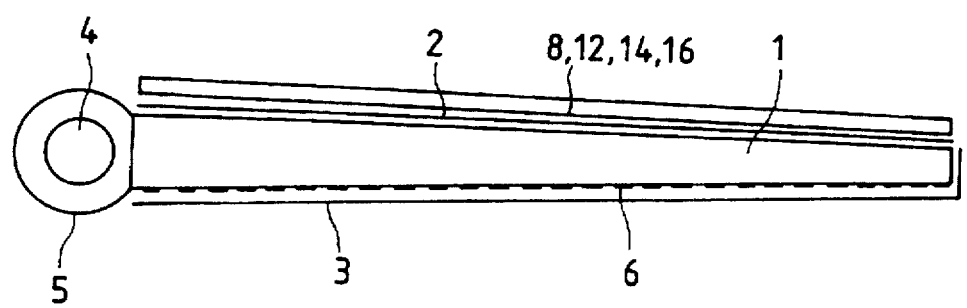
FIG. 18 is a sectional view of the backlighting device of FIG. 17.
Figure 19A:
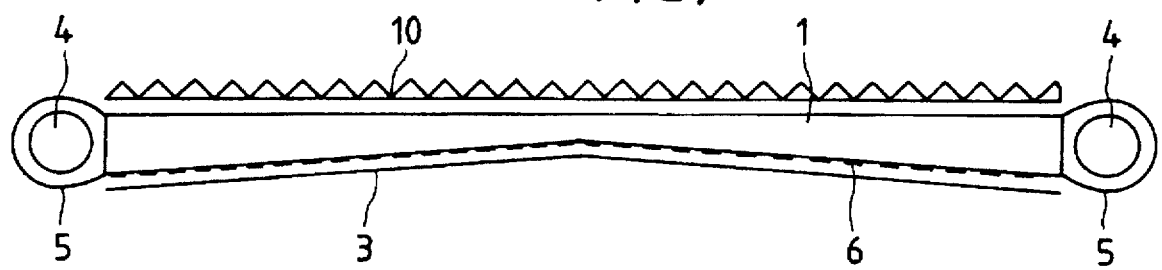
FIGS. 19(a)–19(d) are sectional views showing backlighting devices according to various embodiments of the first aspect of the invention.
Figure 19B:
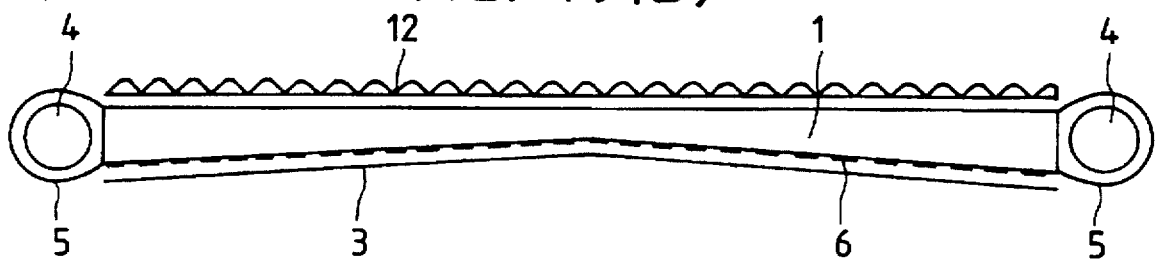
Figure 19C:
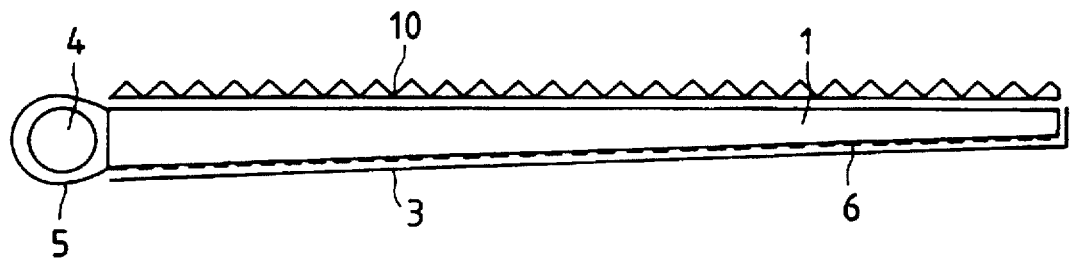
Figure 19D:
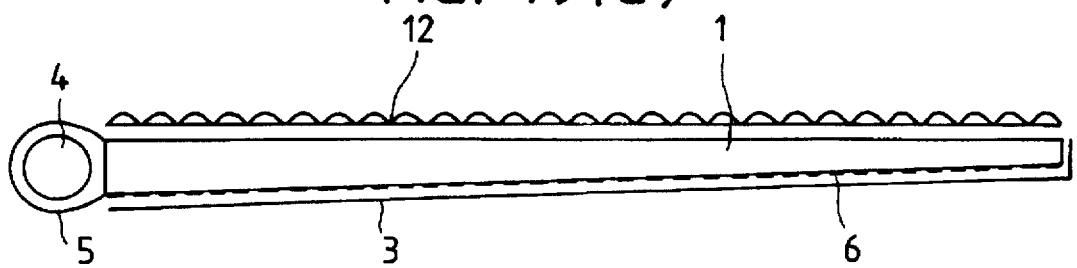

A second aspect of the invention has the following configuration. A transparent sheet is employed which is similar to the above-described one. That is, the transparent sheet has, on the light exit side of the light conducting plate 1, prisms, protrusions or wave-like protrusions (8, 12, 14 or 16) having straight ridges that are arranged at very small intervals. At least one transparent sheet is so disposed that extensions of the straight ridges cross the linear light source 4 approximately perpendicularly. FIG. 17 is a perspective view of a backlighting device according to an embodiment of a second aspect of the invention. A specific description as to the shapes of the prisms, protrusions, etc. of the transparent sheets (8, 12, 14 and 16) used in this embodiment is omitted here.

To positively eliminate stripes that would otherwise be viewed from the light exit side, it is most preferred that the extensions of the straight ridges cross the central axis of the linear light source 4 at about 90°. However, the stripes can be eliminated in the approximate range of 45° to 135°.

The invention, which has the fundamental constitution described above, is applied to a backlighting device for light display panels, particularly a liquid crystal panel. A description will be made of further preferable constitution.

It is preferred that the coating ratio of the light diffusing elements 6 be 1% to 50% at the position on the light conducting plate 1 closest to the linear light source 4 and be 20% to 100% at the position farthest from it, and that the coating ratio gradually increase as the position goes away from the light source 4 starting from a coating point close to the side face that is opposed to the light source 4. The coating ratio is a ratio of a light diffusing element coating area in a unit area of the surface of the light-conducting plate 1 to the total unit area.

It is also preferred that on grid lines on the light emitting surface which line are parallel with the axis of the linear light source 4, the coating ratio of the light diffusing elements 6 gradually increase as the position goes away from the center of those lines (the center is located on a line on the light conducting plate 1 extending from the center of the linear light source 4 in its longitudinal direction and perpendicular to the light source 4).

In the following, the invention will be described in more detail using examples and comparative examples. As shown in FIGS. 19(a)–19(d), a light conducting plate 1 (external dimensions: 210 mm×155 mm) made of polymethyl methacrylate (PMMA) was used in which the thickness decreased linearly from the end face portion (4 mm) opposed to the linear light source 4 to the central portion or the other end face portion (2 mm). Cold-cathode fluorescent tube (produced by Harrison Electric Co., Ltd.) of 3.8 mm in thickness was disposed adjacent to one or both end faces in the longitudinal direction of the light conducting plate 1. An Ag film having a 4-mm slit in its portion that was in contact with the light conducting plate 1 was disposed so as to assume an elliptical shape with its reflecting surface facing the light source 4, and so that the light output from the slit entered the light conducting plate 1 through its end face.

Light diffusing elements 6 in the form of circular dots were printed on the surface (back surface) of the light conducting plate 1 by applying a white paint containing titanium white to intersections (grid points) of imaginary lines 7 arranged on the light conducting plate 1 at intervals of 1 mm (see FIG. 8) so that the coating ratio gradually increased from the minimum point (light source side; 26%) to the maximum point (farthest from the light source 4; 90%).

In directions parallel with the axis of the linear light source 4, the light diffusing elements 6 were printed on the surface of the light conducting plate 1 so that the coating ratio had the minimum value around a line perpendicular to the axis of the linear light source 4 and extending from the center in its longitudinal direction, and gradually increased as the position went away from the line, in an area of the light conducting plate 1 extending from the light-source-side end to a portion around the center line.

The surface of the light conducting plate 1 on which the light diffusing elements 6 had been printed was covered with a 0.125-mm-thick light diffusing/reflecting sheet 3 (Merinex 329 produced by ICI). A single, 0.1-mm-thick light diffusing sheet (D-204 produced by Tsujimoto Electric Manufacturing Co., Ltd.) both surfaces of which were coarsened was disposed on the light exit side of the light conducting plate 1.

The cold-cathode fluorescent tubes were driven with a constant current (5 mA for each tube; 10 mA in total) by applying AC voltages of 30 kHz to the respective tubes from an inverter (CXAM-10L produced by TDK Corp.) An average brightness as measured in the normal direction of the light exit surface using a luminance meter (BM-8 produced by Topcon Corp.) with a viewing angle of 2° was 1,300 cd/m$^2$. Although the dots formed on the light conducting plate 1 in an area close to the linear light source 4 were undiscernible through the light diffusing sheet, the dots formed in an area where the thickness of the light conducting plate 1 was 2–3 mm were recognized through the light diffusing sheet. In particular, the shapes of the dots formed in a thinnest portion where the thickness of the light conducting plate 1 was 2 mm were clearly recognized. No light directivity was found (Comparative Example 1).

Instead of the light diffusing sheet used in Comparative Example 1, a polycarbonate transparent sheet was used which had a number of parallel straight protrusions that were arranged on the same surface of the sheet so that the ridges of the adjacent straight protrusions was 140 µm. The total thickness of the transparent sheet was 250 µm. A measurement was conducted using the same devices under the same conditions as in Comparative Example 1 except that a single transparent sheet was so disposed that the straight ridges were substantially parallel with part of the imaginary lines 7 on the light conducting plate 1 (i.e., crossed at 90° the remaining imaginary lines 7 that were perpendicular to the above imaginary lines 7), and that the ridges are located outside. A brightness thus measured was 1,800 cd/m$^2$. However, the dots formed on the light conducting plate 1 were recognized through the transparent sheet. The dots were recognized such that dots adjacent to each other in the direction perpendicular to the straight ridges were connected to assume a line-like shape (more specifically, a shape of spitted dumplings). Light directivity was found in the normal direction of the light exit surface (Comparative Example 2).

A measurement was conducted using the same devices under the same conditions as in Comparative Example 2 except that the transparent sheet having the straight protrusions used in Comparative Example 2 was so disposed that the straight ridges cross all the imaginary lines 7. A brightness thus measured was 1,800 cd/m$^2$. The dots were undiscernible through the transparent sheet over the entire light emitting surface of the light conducting plate 1. Further, the effect of shielding the dot pattern was examined by moving the sheet. The shielding effect was enhanced when the straight ridges of the sheet cross the imaginary lines 7 on the light conducting plate 1 at 20° to 70°. In particular, the maximum shielding effect was obtained at crossing angles of 22.5°, 26.6° and 45° (visual observation; also applicable to the following description). Light directivity was found in the normal direction of the light exit surface (Example 1).

A measurement was conducted using the same devices under the same conditions as in Comparative Example 2 except that two transparent sheets each being the same as the sheet used in Comparative Example 2 were so arranged that the straight ridges of the respective sheets were parallel with each other. A measured brightness was 1,850 cd/m$^2$. The dots were recognized through the transparent sheets. The dots were recognized such that dots adjacent to each other in the direction perpendicular to the straight ridges were connected to assume a line-like shape (more specifically, a shape of spitted dumplings). A moiré phenomenon was observed as a result of optical interference between the two transparent sheets. Light directivity was found in the normal direction of the light exit surface (Comparative Example 3).

A measurement was conducted using the same devices under the same conditions as in Example 1 except that two transparent sheets each being the same as the sheet used in Comparative Example 2 were so arranged that the straight ridges of the respective sheets cross each other. A brightness thus measured was 1,900 cd/m$^2$. The dots were undiscernible through the transparent sheets over the entire light emitting surface. Further, the shielding effect was enhanced when the straight ridges of the respective sheets cross each other at 75° to 115°. In particular, the maximum shielding effect was obtained at a crossing angle of about 90°. The brightness was also enhanced when the ridges of the respective sheets cross each other at 75° to 115°. In particular, the maximum brightness (2,200 cd/m$^2$) was obtained at a crossing angle of about 90°. Light directivity was found in the normal direction of the light exit surface (Example 2).

A measurement was conducted using the same devices under the same conditions as in Comparative Example 2 except that a polycarbonate transparent sheet having the following structure was used instead of the transparent sheet used in Comparative Example 2. That is, the transparent sheet had a number of straight prisms having an apex angle of 90° that were arranged parallel with each other on the same surface of the sheet. The interval between the adjacent ridges was 350 µm, and the total thickness of the sheet was 360 µm. A measured brightness was 2,000 cd/m². The dots were recognized through the transparent sheet. The dots were recognized such that dots adjacent to each other in the direction perpendicular to the straight ridges of the sheet assumed an elliptical shape (that is, they were not connected to each other as in the case of Comparative Example 2). Light directivity was found in the normal direction of the light exit surface (Comparative Example 4).

A measurement was conducted by disposing the transparent sheet of Comparative Example 2 in the same manner as in Example 1. A measured brightness was 2,000 cd/m². The dots were not recognized through the transparent sheet over the entire light emitting surface. Further, the effect of shielding the dot pattern was examined by moving the sheet. The shielding effect was enhanced when the straight ridges of the sheet cross the imaginary lines 7 on the light conducting plate 1 at 20° to 70°. In particular, the maximum shielding effect was obtained at crossing angles of 22.5°, 26.6° and 45°. Light directivity was found in the normal direction of the light exit surface (Example 3).

The dot pattern shielding effect was examined by arranging two transparent sheet each being the same as the transparent of Comparative Example 4 in the same manner as in Example 2. The shielding effect was enhanced when the straight ridges of the respective sheets cross each other at 75° to 115°. In particular, the maximum shielding effect was obtained at a crossing angle of about 90°. The brightness was also enhanced when the ridges of the respective sheets cross each other at 75° to 115°. In particular, the maximum brightness (2,100 cd/m²) was obtained at a crossing angle of about 90°. Light directivity was found in the normal direction of the light exit surface (Example 4).

The effect of shielding the dot pattern formed on the light conducting plate 1 was examined by moving the transparent sheet using the same devices under the same conditions as in Example 1 except that circular dots were printed on the light conducting plate 1 by applying a paint containing titanium white to intersecting points (grid points) of imaginary lines 7 (see FIG. 9) on the light conducting plate 1 which lines have intervals of 1 mm and cross each other at a minimum angle of 60°. The shielding effect was enhanced when the straight ridges of the transparent sheet cross the imaginary lines 7 on the light conducting plate 1 at 13° to 47°. In particular, the maximum shielding effect was obtained at crossing angles of 19.1° and 30°. Light directivity was found in the normal direction of the light exit surface (Example 5).

The effect of shielding the dot pattern formed on the light conducting plate 1 was examined by moving the transparent sheet using the same devices under the same conditions as in Example 1 except that stripes were printed on the light conducting plate 1 by applying a paint containing titanium white to parallel lines having intervals of 1 mm (see FIG. 10) on the light conducting plate 1. The shielding effect was enhanced when the straight ridges of the transparent sheet cross the imaginary line 7 at 20° to 79°. In particular, the maximum shielding effect was obtained at crossing angles of 22.5°, 26.6° and 45°. Light directivity was found in the normal direction of the light exit surface (Example 6).

As shown in FIG. 17, a light conducting plate 1 (external dimensions: 210 mm×155 mm) made of PMMA was used in which the thickness decreased linearly from the end face portion (3 mm) opposed to the linear light source 4 to the farthest portion (1.5 mm). A cold-cathode fluorescent tube (produced by Harrison Electric Co., Ltd.) of 3 mm in thickness was disposed adjacent to the shorter-side end face of the light conducting plate 1. An Ag film having a 3-mm slit in its portion that was in contact with the light conducting plate 1 was disposed so as to assume an elliptical shape with its reflecting surface facing the light source 4, and so that the light output from the slit entered the light conducting plate 1 through its end face.

Light diffusing elements 6 in the form of circular dots were printed on the surface of the light conducting plate 1 opposite to the light exit surface by applying a white paint containing titanium white to intersections (grid points) of imaginary lines 7 arranged on the light conducting plate 1 at intervals of 1 mm (see FIG. 8) so that the coating ratio gradually increased from the minimum point (light source side; 10%) to the maximum point (farthest from the light source 4; 85%).

In directions parallel with the axis of the linear light source 4, the light diffusing elements 6 were printed on the surface of the light conducting plate 1 so that the coating ratio had the minimum value around a line perpendicular to the axis of the linear light source 4 and extending from the center in its longitudinal direction, and gradually increased as the position went away from the line, in an area of the light conducting plate 1 extending from the light-source-side end to a portion around the center line.

The surface of the light conducting plate 1 on which the light diffusing elements 6 had been printed was covered with a 0.125-mm-thick light diffusing/reflecting sheet 3 (Merinex 329 produced by ICI). A single, 0.18-mm-thick polycarbonate light diffusing sheet (8B36 produced by Sansei Bussan Co, Ltd.) one surface of which was coarsened was disposed on the light exit side of the light conducting plate 1 so that the coarsened surface was located on the side opposite to the light exit surface of the light conducting plate 1.

The cold-cathode fluorescent tube was driven with a constant current (5 mA) by applying an AC voltage of 30 kHz to it from an inverter (CXAM-10L produced by TDK Corp.) An average brightness as measured at uniformly distributed 100 points on the light emitting surface in the normal direction of the light exit surface using a luminance meter (BM-8 produced by Topcon Corp.) with a viewing angle of 2° was 1,300 cd/m². Stripes of light were observed on the surface of the light conducting plate 1 (Comparative Example 5).

A measurement was conducted using the same devices under the same conditions as in Comparative Example 5 except that a single polycarbonate sheet (BEF-90 produced by 3M) that was equipped with a number of prisms (apex angle: 90°) having straight ridges arranged substantially parallel with each other at intervals of 50 µm on the same surface was disposed on the light exit side of the light diffusing sheet so that the straight ridges were substantially parallel with the axis of the cold-cathode fluorescent tube. A measured brightness was 1,950 cd/m². However, stripes of light were observed on the surface of the light conducting plate 1. In particular, stripes as observed in the normal direction of the light exit surface were more remarkable than those in Comparative Example 5. That is, there could not be obtained uniform plane-like light emission. The high-brightness portions of the stripes were more than 10 times brighter than the other portions. Thus, the backlighting device of this example was not suitable for actual use (Comparative Example 6).

A measurement was conducted using the same devices under the same conditions as in Comparative Example 5 except that one or more sheets (BEF-90 produced by 3M) that were the same as the above sheet were disposed on the light exit side of the light diffusing sheet so that extensions of the straight ridges intersect the axis of the cold-cathode fluorescent tube substantially perpendicularly. A measured brightness was 1,950 cd/m². No stripes of light were observed on the surface of the light conducting plate 1 (Example 7).

A measurement was conducted using the same devices under the same conditions as in Example 7 except that one or more sheets (BEF-90 produced by 3M) were additionally disposed on the light exit side of the above sheet (BEF-90 produced by 3M) so that extensions of the straight ridges were substantially parallel with the axis of the cold-cathode fluorescent tube. A measured brightness was 2,700 cd/m². No stripes of light was observed on the surface of the light conducting plate 1 (Example 8).

A measurement was conducted using the same devices under the same conditions as in Comparative Example 5 except that a single sheet that was equipped with a number of straight protrusions (the cross-section of a ridge is a part of an ellipse) formed on a 100-μm-thick PET film using an ultraviolet curing resin and arranged substantially parallel with each other at intervals of 110 μm on the same surface was disposed on the light exit side of the light diffusing sheet so that the straight ridges were substantially parallel with the axis of the cold-cathode fluorescent tube. A measured brightness was 1,690 cd/m². However, stripes of light were observed on the surface of the light conducting plate 1. In particular, stripes as observed in the normal direction of the light exit surface were more remarkable than those in Comparative Example 5. That is, there could not be obtained uniform plane-like light emission. The high-brightness portions of the stripes were more than 10 times brighter than the other portions. Thus, the backlighting device of this example was not suitable for actual use (Comparative Example 7).

A measurement was conducted using the same devices under the same conditions as in Comparative Example 7 except that one or more sheets having the above straight protrusions were disposed on the light exit side of the light diffusing sheet so that extensions of the straight ridges intersect the axis of the cold-cathode fluorescent tube substantially perpendicularly. A measured brightness was 1,690 cd/m². No stripes of light were observed on the surface of the light conducting plate 1 (Example 9).

A measurement was conducted using the same devices under the same conditions as in Example 7 except that one or more sheets (BEF-90 produced by 3M) were additionally disposed on the light exit side of the sheet having the straight protrusions so that the straight ridges were substantially parallel with the axis of the cold-cathode fluorescent tube. A measured brightness was 2,530 cd/m². No stripes of light was observed on the surface of the light conducting plate 1 (Example 10).

The invention can provide a high power-brightness conversion efficiency. The light diffusing elements formed on the wedge-shaped light conducting plate are sufficiently shielded; sufficient shielding effect can be obtained even with an ultrathin light conducting plate whose thinnest portion has a thickness of 1 mm, for instance. Such a backlighting device can be used as a compact backlighting device.

According to the invention, particularly in the backlighting device using a light conducting plate in which the major surface has a straight cross-section, there can be obtained uniform plane-like light emission that has a high brightness and can prevent appearance of stripes.

What is claimed is:

1. A backlighting device comprising:

at least one linear light source;

a light conducting plate made of a transparent material and having a side face adjacent to the light source, a thickness of the light conducting plate decreasing as a position goes away from the light source;

light diffusing elements formed on a major surface of the light conducting plate opposite to a light exit surface thereof; and at least one sheet made of a transparent material having, on a same surface thereof, at least one of a number of prisms and protrusions having straight ridges that are arranged substantially parallel with each other at small intervals, the sheet being disposed on a side of the light exit surface of the light conducting plate so that extensions of the straight ridges are substantially perpendicular to a central, longitudinal axis of the light source.

2. The backlighting device according to claim 1, wherein the ridges of the protrusions of the sheet have cross-sections whose shapes include at least one of a triangle, part of a circle, part of an ellipse, and a wave-like shape.

3. The backlighting device according to claim 1, wherein a distance between adjacent apexes of adjacent straight ridges of the sheet is arranged at an interval of 10 to 1,000 μm.

4. The backlighting device according to claim 2, wherein a cross-section of at least the light exit surface of the light conducting plate forms a straight line.

5. The backlighting device according to either claim 1 or claim 4, wherein a distance between adjacent light diffusing elements is arranged at an interval of 0.03 to 2 mm.

6. The backlighting device according to claim 1, wherein the light diffusing elements are dotted light diffusing elements which are so formed that imaginary lines connecting centers of the dotted light diffusing elements being adjacent to each other at minimum intervals form squares.

7. The backlighting device according to claim 6, wherein the sheet is so disposed that the straight ridges cross the imaginary lines at 20° to 70°.

8. The backlighting device according to claim 1, wherein the light diffusing elements are dotted light diffusing elements which are so formed that imaginary lines connecting centers of the dotted light diffusing elements being adjacent to each other at minimum intervals form parallel straight lines.

9. The backlighting device according to claim 8, wherein the sheet is so disposed that the straight ridges cross the imaginary lines at 20° to 70°.

10. The backlighting device according to claim 1, wherein the light diffusing elements are dotted light diffusing elements which are so formed that imaginary lines connecting centers of the dotted light diffusing elements being adjacent to each other at minimum intervals form regular triangles.

11. The backlighting device according to claim 10, wherein the sheet is so disposed that the straight ridges cross the imaginary lines at 10° to 50°.

* * * * *